United States Patent
Craig

[11] Patent Number: 6,054,531
[45] Date of Patent: Apr. 25, 2000

[54] EMULSION POLYMERIZED POLYACRYLATE RUBBER, IMPACT MODIFIERS AND BLENDS OBTAINED THEREFROM, AND METHOD FOR MAKING

[75] Inventor: Daniel Horace Craig, Niskayuna, N.Y.

[73] Assignee: General Electric Company, Schenectady, N.Y.

[21] Appl. No.: 09/197,788

[22] Filed: Nov. 23, 1998

[51] Int. Cl.[7] .................................................. C08G 63/91
[52] U.S. Cl. ........................... 525/64; 526/318.4; 525/65; 525/66; 525/67; 525/68; 525/185; 525/190; 525/224; 525/242
[58] Field of Search ......................... 526/318.4; 525/242, 525/64, 65, 66, 67, 68, 185, 190, 224

[56] References Cited

U.S. PATENT DOCUMENTS

| | | | |
|---|---|---|---|
| 3,691,260 | 9/1972 | Mittnacht et al. | 525/75 |
| 3,830,878 | 8/1974 | Kato et al. | 525/72 |
| 4,224,419 | 9/1980 | Swoboda et al. | 525/71 |
| 4,341,883 | 7/1982 | Gift | 525/82 |
| 4,753,988 | 6/1988 | Henton et al. | 52/73 |
| 4,994,522 | 2/1991 | Sasaki et al. | 525/63 |
| 5,132,359 | 7/1992 | Sasaki et al. | 525/63 |

*Primary Examiner*—Rachel Gorr
*Attorney, Agent, or Firm*—Noreen C. Johnson; Douglas E. Stoner

[57] ABSTRACT

Weatherable thermoplastic compositions, such as a copolymer of styrene and acrylonitrile (SAN) are provided having improved impact strength. Improvements in thermoplastic composition properties are the result of the incorporation of the graft of an emulsion polymerized cross-linked poly (acrylate) rubber. The emulsion polymerized cross-linked poly(acrylate) rubber is synthesized in the presence of an effective amount of an alpha-alkylstyrenic monomer, such as alpha-methylstyrene dimer; the emulsion polymerized cross-linked poly(acrylate) rubber can be monomodal or bimodal.

15 Claims, No Drawings

EMULSION POLYMERIZED POLYACRYLATE RUBBER, IMPACT MODIFIERS AND BLENDS OBTAINED THEREFROM, AND METHOD FOR MAKING

BACKGROUND OF THE INVENTION

The present invention relates to a method for making emulsion polymerized cross-linked poly(acrylate) rubber, which has been synthesized in the presence of an alpha-alkylstyrenic monomer, such as alpha-methylstyrene dimer (AMSD). More particularly, the present invention relates to grafts of such cross-linked poly(acrylate) rubber, and to blends of such impact modifiers in various thermoplastic resins.

Acrylate-styrene-acrylonitrile (ASA) resins are generally recognized as weatherable high impact thermoplastics. The incorporation of grafted acrylate derived rubber into a styrene-acrylonitrile matrix has been found to enhance the impact strength of such resins. It has been found that the saturated nature of acrylate-derived rubber prevents embrittlement of the thermoplastic over time. Such impact modified resins are used in many applications requiring good weatherability, including automotive, building, and construction applications, and in articles of manufacture such as garden furniture, boats, signs, outdoor enclosures for electrical or telecommunications interface devices, and the like.

The synthesis of cross-linked acrylate-derived rubbers can be effected through the generation of alkyl acrylate particles during the emulsion polymerization of alkyl acrylates, such as butylacrylate and dicyclopentenyloxyethylmethacrylate. In bimodal cross-linked acrylate-derived rubbers, distinct alkyl acrylate particle size ranges can be formed in the range of about 50 nm to 150 nm, and up to about 200 nm to about 2000 nm. These cross-linked acrylate-derived rubbers can be respectively grafted with an acrylonitrile-styrene copolymer. The grafted cross-linked alkyl acrylate structures can be readily blended as impact modifiers with a hard component such as a copolymer of styrene and/or -methylstyrene, with acrylonitrile.

It is generally known that there is a direct relationship between the gel content or swell index of emulsion polymerized cross-linked poly(acrylate) rubber, and the performance of a graft of such cross-linked poly(acrylate) rubber, as an impact modifier in a thermoplastic material. It is also known that there is a direct relationship between residual rubber unsaturation and graft efficiency.

Some of the efforts to improve graft efficiency in cross-linked polyacrylate rubber systems have been based on the development of rubber compositions having optimized multi-layer structures as shown in U.S. Pat. Nos. 3,830,878 and 4,341,883. Other approaches, as shown by U.S. Pat. No. 4,753,988, address optimized variations in crosslinking monomer concentrations for different particle sizes of bimodal particle size distributions.

It would be advantageous therefor to have a process for independently controlling cross-linked poly(acrylate) rubber swell index, gel content, and graft-linking without having to resort to such techniques as multilayer structures to achieve such regulation. It also would be desirable to achieve such control for independently influencing cross-linked poly(acrylate) rubber swell index, gel content, and graft-linking in a single synthesis step. It would be further advantageous to have improved thermoplastic compositions containing impact modifiers in the form of grafts of such cross-linked poly(acrylate) rubber.

BRIEF SUMMARY OF THE INVENTION

The present invention is based on the discovery that the synthesis of cross-linked polyacrylate rubber in the presence of an alpha-alkylstyrenic compound, such as alpha-methylstyrene dimer (AMSD), can result in significant control over the resulting cross-linked polyacrylate rubber swell index, which is a measure of cross-link density, without altering the gel content of the rubber. The cross-linked polyacrylate rubber can be monomodal, or bimodal, and the alpha-alkylstyrenic compound can be present in either, or both modes.

STATEMENT OF THE INVENTION

There is provided by the present invention, a method for controlling the swell index and gel content of an emulsion polymerized cross-linked polyacrylate rubber having an average particle size in the range of from about 50 nm to about 2 microns, which method comprises, effecting reaction under emulsion polymerization conditions of (a) a polymerizable acrylate mixture comprising acrylic acid ester, and a sufficient amount of a polyfunctional crosslinking monomer to produce a cross-linked polyacrylate rubber, where the polymerization of (a) is effected in the presence of an effective amount of an alpha-alkylstyrenic compound.

In a further aspect of the present invention, there is provided a method for making a cross-linked polyacrylate rubber graft copolymer comprising effecting reaction between (b), about 30% to about 70% by weight of a monomer mixture of styrene and acrylonitrile having a weight ratio of about 90:10 to 50:50 and about 70% to about 30% by weight of (c) a cross-linked polyacrylate rubber which has been emulsion polymerized in the presence of about 0.01% to about 5.0% of an alpha-alkylstyrenic compound based on the weight of acrylic rubber monomer.

In an additional aspect of the present invention, there is provided a thermoplastic composition having improved weatherability, comprising a blend of a thermoplastic polymer, and 5% to 75% by weight of the thermoplastic composition, of an impact modifier in the form of a graft of a cross-linked polyacrylate rubber, which cross-linked polyacrylate rubber has been emulsion polymerized in the presence of an effective amount of an alpha-alkylstyrenic compound.

In yet an additional aspect of the present invention, there is provided an article of manufacture made from a thermoplastic composition comprising a blend of a thermoplastic polymer, and 5% to 75% by weight of the thermoplastic composition, of an impact modifier in the form of a graft of a cross-linked polyacrylate rubber, which cross-linked polyacrylate rubber has been emulsion polymerized in the presence of an effective amount of an alpha-alkylstyrenic compound.

DETAILED DESCRIPTION OF THE INVENTION

In the practice of the method of the present invention, a cross-linked polyacrylate latex is initially formed under emulsion polymerization conditions which can be performed in the presence of an alpha-alkylstyrenic compound in a batch, semi-batch, or semi-continuous mode. Temperatures in the range of 5° C. to 95° C. can be employed. Typical emulsion polymerization conditions and emulsifying agents are shown by Mittnacht et al., U.S. Pat. No. 3,691,260, and Swoboda et al., U.S. Pat. No. 4,224,419, which are incorporated herein by reference.

Useful cross-linked polyacrylate rubbers can be made in accordance with the present invention by the emulsion polymerization of alkyl or alkoxyalkyl acrylates containing six or more carbon atoms. For example, there can be employed n-butylacrylate and ethylhexylacrylate. Comonomers such as alkyl or alkoxyalkyl acrylates containing less than six carbon atoms, as well as monomers such as styrene, and styrene derivatives, acrylonitrile, methacrylonitrile, also can be used as long as the acrylate rubber retains its elastomeric properties. These alkyl acrylates can be used in combination with a cross-linking or graft-linking monomer to make the cross-linked polyacrylate rubber.

Among the cross-linking monomers which can be used, there are included multi-functional (meth)acrylate esters, for example, dicyclopentenyl(meth)acrylate or dicyclopentenyloxyethyl(meth)-acrylate esters; in addition divinyl benzene, allyl esters, for example, triallylcyanurate, allyl amines, or allylethers also can be used. The practice of the present invention also can be applied with additional cross-linked acrylate rubber compositions, such as compositions comprising silicone -acrylate hybrid rubbers, as shown in U.S. Pat. Nos. 4,994,522 and 5,132,359.

There are included among the alpha-alkylstyrenic compounds which can be used during the emulsion polymerization of the alkyl or alkoxyalkyl acrylates in combination with a cross-linking, or graft-linking monomer to form cross-linked polyacrylate rubber, alpha-methylstyrene and derivatives, such as alpha-methylstyrene dimer and higher oligomers. Reference is also made to Techlon M 21, referred to as "methylstyrene oligomer" of the Tekchem Corp of Tokyo, Japan. The main active ingredient of Techlon M 21 is listed as 2,4-diphenyl-4-methyl-1-pentene. An effective amount of alpha-methylstyrene dimer, for example, which can provide particularly efficient polymerization processing characteristics together with swell index control is about 0.01% to about 5.0% by weight based on the weight of acrylic rubber monomer, and preferably, between about 0.05% to about 1.0%.

Among the preferred thermoplastics which can be advantageously grafted onto the cross-linked polyacrylate rubbers of the present invention are thermoplastics made from styrene and styrene derivatives, acrylonitrile, methacrylonitrile, esters of acrylic acid, methacrylic acid and copolymers thereof. These grafts can be blended with thermoplastics such as polyesters, polycarbonates, polyestercarbonates, polyamides, polyetherimides, and polyphenylene ethers, as well as with thermoplastics made from styrene and styrene derivatives, acrylonitrile, methacrylonitrile, esters of acrylic acid, methacrylic acid and copolymers thereof.

In order that those skilled in the art will be better able to practice the invention, the following examples are given by way of illustration and not by way of limitation. All parts are by weight unless otherwise indicated.

Weight percent solids were determined utilizing a CEM Labwave 9000 gravimetric microwave drier, drying to a constant weight at 50% full microwave output. Particle size distributions were determined utilizing a Nicomp 370 Submicron Particle Sizer instrument applying a gaussian analysis protocol for monomodal distributions and a Nicomp analysis protocol for multi modal distributions. All particle size values are reported as volume average values.

Swell index measurements were performed by diluting a small amount of the aqueous emulsion into acetone consistent with an intensity readout of >250<350 on the Nicomp 370 instrument, stirring overnight at room temperature to ensure equilibrium swelling, then measuring particle size with a cubed diameter ratio comparison to the particle size as measured in water. Gel content was determined by diluting about 0.5 g of a specified rubber latex into a known amount of acetone (about 50 g) with stirring at ambient temperature for 24 hours, and then centrifuging the dilute dispersion for 2 hours at 15,000 rpm in a Sorvall Superspeed RC2-B Automatic Refrigerated Centrifuge. A measured aliquot of the supernatant is removed and evaporated to dryness, allowing gravimetric determination of the soluble portion to determine gel content.

In the following examples, emulsion polymerized cross-linked poly (butylacrylate) rubbers were characterized with respect to Particle Size, Swell Index, and Gel Content.

EXAMPLE 1

A mixture of 2464 g of distilled water, 4.4 g of sodium carbonate, 1.54 g of sodium lauryl sulfate, and 7 g of sodium persulfate, is stirred in a reactor and heated to 80° C. While the mixture is stirring, there is pumped into the reactor over a 2.5 hour period, a pre-emulsified mixture of 616 g of distilled water, 10.8 g of sodium lauryl sulfate, 2156 g of butylacrylate, 42.5 g dicyclopentenyloxyethylmethacrylate, and 5 g of alpha-methylstyrene dimer. The total reaction mixture is then heated at 85° C. for an additional 2 hours, cooled to room temperature and characterized. Based on method of preparation, an emulsion polymerized poly (butylacrylate) rubber was formed having an average particle size Dv (nm) of 128.

The above procedure was repeated several times, except that the level of alpha-methylstyrene dimer was varied from 0, 10, and 15 g.

The following results were obtained showing AMSD concentration, Particle Size, Swell Index and Gel Content.

TABLE 1

| AMSD Concentration (% by weight based on rubber) | Particle Size Dv (nm) | Swell Index | Gel Content (% by weight) |
|---|---|---|---|
| 0 | 121 | 7.4 | 88.5 |
| 0.25 | 128 | 11 | 85.4 |
| 0.5 | 124 | 15.6 | 83.4 |
| 0.75 | 122 | 22.4 | 83.0 |

EXAMPLE 2

A mixture of 2464 g of distilled water, 4.4 g of sodium carbonate, and 5 g of sodium persulfate, is stirred in a reactor and heated to 80° C. While the mixture is stirring, there is pumped into the reactor over a 2.5 hour period, a pre-emulsified mixture of 616 g of distilled water, 3 g of sodium lauryl sulfate, 2156 g of butylacrylate, 42.5 g dicyclopentenyloxyethylmethacrylate, and 5 g of alpha-methylstyrene dimer. The total reaction mixture is then heated at 85° C. for an additional 2 hours, cooled to room temperature and characterized. Based on method of preparation, an emulsion polymerized poly (butylacrylate) rubber was formed having an average particle size Dv 651.

The above procedure was repeated several times, except that the level of alpha-methylstyrene dimer was varied from 0, 10, and 15 g.

The following results were obtained:

TABLE 2

| AMSD Concentration (% by weight based on rubber) | Particle Size Dv (nm) | Swell Index | Gel Content (% by weight) |
|---|---|---|---|
| 0 | 719 | 6.5 | 86.2 |
| 0.25 | 651 | 15.3 | 84.5 |
| 0.5 | 652 | 31.2 | 84.7 |

The results shown in Tables 1 and 2 illustrate the dramatic effect of AMSD on final cross-linked poly(butylacrylate) swell index without an inordinate loss in gel content.

Bimodal blends of cross-linked poly(butylacrylate) rubber compositions are prepared by combining respective cross-linked poly(butylacrylate) rubber blends from examples 1 and 2, which have been reacted with from 0 to 0.5% of ASMD, based on weight of rubber, which are then respectively grafted with a styrene-acrylonitrile copolymer. The respective grafts are suitable for incorporation into styrene-acrylonitrile thermoplastics as impact modifiers. The following shows the procedure used in preparing the grafts of the respective cross-linked poly(butylacrylate) rubbers:

EXAMPLE 3

A styrene-acrylonitrile copolymer graft of a bimodal blend of cross-linked poly(butylacrylate) rubber free of ASMD is prepared by pumping into a reactor over a two hour period, a pre-emulsified grafting mixture. The grafting mixture consists of 378 g of distilled water, 5.5 g sodium lauryl sulfate, 720 g styrene, and 360 g acrylonitrile.

Prior to the introduction of the grafting mixture into the reactor, the reactor contains a mixture which is stirring at 80° C., which consists of 1100 g of distilled water, 1294 g of a cross-linked poly(butylacrylate) rubber mixture of example 1, having a particle size Dv (nm) of 121, and free of ASMD, and 1291 g of a cross-linked poly(butylacrylate) rubber mixture of example 2, having a particle size Dv (nm) of 719, and free of ASMD. The resulting total reaction mixture is then heated at 85° C. for an additional 2 hours, cooled to room temperature and characterized.

The above procedure is repeated several additional times, except that the grafting mixture is introduced into the reactor at 80° C. to provide graft copolymers of bimodal cross-linked poly(butylacrylate) rubbers which are formed from acrylic ester monomers in the presence of 0.25% to 0.5% by weight of AMSD based on weight of rubber. A stirring reactor mixture designed to make graft copolymers using 0.25% AMSD rubber on small and large particles was prepared from a stirring reactor mixture of 1306 g of the 651 nm particle size rubber mixture, and 1304 g of the 128 nm particle size rubber mixture. A stirring reactor mixture of 1298 g of the 652 particle size mixture of example 2, and 1299 g of the 124 particle size mixture of example 1 was used to make a bimodal graft using 0.5% AMSD. Additional grafts were made following the same procedures whereby mixed small and large particle blends were used which were formed in the presence of 0% or 0.5% of AMSD.

The resulting latexes from the above graft compositions are coagulated in a 1.5% aqueous calcium chloride solution maintained at 85° C. by slowly adding one part of the latex to one part of calcium chloride solution. The resulting polymer solids were filtered, washed with distilled water at ambient temperatures, and dried in a vacuum oven at 50° C. for 48 hours to yield a fine powder.

Dry blends of 54 parts of the dried graft copolymer, 46 parts of a 75:25 by weight copolymer of styrene and acrylonitrile (SAN), and 1 part of Irganox 1076 were extruded to form pellets, using a Welding Engineers 20 mm twin-screw extruder at 450° F. set temperature, 400 rpm, and 15–17 lbs/hour throughout. The pellets were injection molded into test specimens using an Engel 30 ton Injection Molder with a 450° F. barrel set temperature and mold temperature of 145° F. Notched Izod impact values were averaged from five samples (specimen width 0.125, 2 ft.lb. pendulum capacity) were obtained using a Testing Machines Inc. Monitor/impact instrument model #43-02 at room temperature.

Table 3 shows impact strength data from 27% rubber impact modified ASA thermoplastic materials based on the data obtained from the above injection molded test specimens. These test specimens were obtained from the above-described cross-linked polybutylacrylate rubbers, where a 50/50 by weight bimodal polybutylacrylate particle size distribution was employed.

TABLE 3

| AMSD Concentration Ratio (% by weight based on rubber for small/large particle size) | Particle Size Ratio Dv-small Dv-large (nm) | Swell Index Ratio for small/large PBA | Room Temperature Izod Impact Values (ft-lb/in) |
|---|---|---|---|
| 0/0 | 121/719 | 7.4/6.5 | 2.6 |
| 0.25/0.25 | 128/651 | 11/15.3 | 5.9 |
| 0.5/0.5 | 124/652 | 15.6/31.2 | 3.2 |
| 0/0.5 | 121/652 | 7.4/31.2 | 4.0 |
| 0.5/0 | 124/719 | 15.6/6.5 | 6.4 |

The impact strength results show that significant improvements are possible with the addition of AMSD during the synthesis of the cross-linked polybutylacrylate rubber.

What is claimed is:

1. A method for controlling the swell index and gel content of emulsion polymerized cross-linked polyacrylate rubber having an average particle size in the range of from about 50 nm to about 2 microns, which method comprises, effecting reaction under emulsion polymerization conditions of (a) a polymerizable acrylate rubber monomer comprising acrylic acid ester, and a sufficient amount of a polyfunctional crosslinking monomer to produce a cross-linked polyacrylate rubber, where the polymerization of (a) is effected in the presence of an effective amount of an alpha-alkylstyrenic compound.

2. A method in accordance with claim 1, where the emulsion polymerized cross-linked polyacrylate rubber is bimodal.

3. A method in accordance with claim 1, where the polymerizable acrylate rubber mixture comprises comonomers selected from the group consisting of alkylmethacrylates, alkoxyalkylmethacrylates, and a mixture thereof.

4. A method in accordance with claim 1, where the polyfunctional crosslinking monomer is selected from the group of dicyclopentenyloxyethylmethacrylate, tricyclodecenyl acrylate and triallylcyanurate.

5. A method in accordance with claim 1, where the alpha-alkylstyrenic compound is an alpha-methylstyrenic dimer.

6. A cross-linked polyacrylate rubber made in accordance with claim 1.

7. A bimodal cross-linked polyacrylate rubber made in accordance with claim 1.

8. A method for making a cross-linked polyacrylate rubber graft copolymer comprising effecting reaction between (b), about 30% to about 70% by weight of a monomer mixture of styrene and acrylonitrile having a weight ratio of about 90:10 to 50:50 and about 70% to about 30% by weight of (c) at least one cross-linked polyacrylate rubber which has been emulsion polymerized in the presence of about 0.01% to about 5.0% of an alpha-alkylstyrenic compound based on the weight of the acrylic rubber monomer.

9. A method for making a cross-linked polyacrylate rubber graft copolymer in accordance with claim 8, where the alpha-alkylstyrenic compound is alpha-methylstyrene dimer.

10. A cross-linked polyacrylate rubber graft copolymer made in accordance with claim 8.

11. A thermoplastic composition comprising a blend of a thermoplastic polymer and 5% to 75% by weight of the thermoplastic composition of an emulsion polymerized cross-linked polyacrylate rubber, or graft thereof, which emulsion polymerized cross-linked polyacrylate rubber is formed in the presence of an effective amount of an alpha-alkylstyrenic compound.

12. A thermoplastic composition in accordance with claim 11, where the thermoplastic polymer is at least one polyester, polycarbonate, polyestercarbonate, polyamide, polyetherimide, polyphenylene ether, polystyrene, or a copolymer of styrene with acrylonitrile, methacrylonitrile, esters of acrylic acid, methacrylic acid or copolymers thereof.

13. A thermoplastic composition in accordance with claim 12, where the thermoplastic polymer is a copolymer of styrene and acrylonitrile.

14. An article of manufacture made from the composition of claim 12.

15. An article according to claim 14 comprising an outdoor enclosure for an electrical or telecommunications interface device.

\* \* \* \* \*